United States Patent
Boehm et al.

(10) Patent No.: US 7,875,147 B2
(45) Date of Patent: Jan. 25, 2011

(54) METHOD FOR WELDING TOGETHER PLASTIC PARTS WITH THE AID OF LASER RADIATION

(75) Inventors: Arno Boehm, Mannheim (DE); Andreas Haas, Neuhofen (DE); Werner Rautenberg, Rueckersdorf (DE); Michel Sieffert, Wackernheim (DE)

(73) Assignee: BASF Akiengesellschaft, Ludwigshafen (DE)

(*) Notice: Subject to any disclaimer, the term of this patent is extended or adjusted under 35 U.S.C. 154(b) by 364 days.

(21) Appl. No.: 11/578,149

(22) PCT Filed: Apr. 8, 2005

(86) PCT No.: PCT/EP2005/003689
§ 371 (c)(1),
(2), (4) Date: Oct. 10, 2006

(87) PCT Pub. No.: WO2005/102672
PCT Pub. Date: Nov. 3, 2005

(65) Prior Publication Data
US 2007/0221321 A1    Sep. 27, 2007

(30) Foreign Application Priority Data
Apr. 14, 2004   (DE) .................. 10 2004 018 547

(51) Int. Cl.
B29C 65/00   (2006.01)
B32B 37/00   (2006.01)
B32B 38/04   (2006.01)
C08K 5/34    (2006.01)
C08K 5/48    (2006.01)
C08K 5/3445  (2006.01)
C09B 67/00   (2006.01)

(52) U.S. Cl. .................... 156/272.8; 524/88; 524/105; 524/190

(58) Field of Classification Search ............ 156/272.8; 524/88, 105, 190
See application file for complete search history.

(56) References Cited

U.S. PATENT DOCUMENTS

| | | | | |
|---|---|---|---|---|
| 4,055,780 A * | 10/1977 | Kawai et al. | ............ | 313/346 R |
| 6,319,613 B1 * | 11/2001 | Takeda et al. | ............ | 428/412 |
| 2001/0029976 A1 * | 10/2001 | Takeyama et al. | ............ | 136/244 |
| 2002/0182422 A1 * | 12/2002 | Garrett et al. | ............ | 428/437 |
| 2003/0125429 A1 | 7/2003 | Joachimi et al. | | |
| 2003/0130381 A1 | 7/2003 | Joachimi et al. | | |
| 2003/0181721 A1 | 9/2003 | Wuerthner et al. | | |
| 2005/0003301 A1 | 1/2005 | Sugawara et al. | | |
| 2006/0116461 A1 | 6/2006 | Takeda | | |

FOREIGN PATENT DOCUMENTS

| | | |
|---|---|---|
| CA | 1284125 | 5/1991 |
| DE | 44 32 081 | 3/1996 |
| DE | 195 12 773 | 10/1996 |
| DE | 198 14 298 | 10/1999 |
| EP | 0 126 787 | 12/1984 |
| EP | 0 159 169 | 10/1985 |
| EP | 1 418 202 | 5/2004 |
| EP | 1541012 A1 | 6/2005 |
| WO | 00 20157 | 4/2000 |
| WO | 03 059619 | 7/2003 |
| WO | 03 104232 | 12/2003 |
| WO | 2005 047010 | 5/2005 |

OTHER PUBLICATIONS

Jones, I. A. et al., "Use of Infrared Dyes for Transmission Laser Welding of Plastics", Antec. Conference Proceedings, pp. 1166-1170, 2000.
Song et al., "A new water-soluble near-infrared croconium dye", ScienceDirect, Dyes and Pigments 78 (2008), pp. 60-64.
Song et al., "The synthesis and photostability of novel squarylium indocyanine dyes", Dyes and Pigments, 82 (2009), pp. 396-400.
"Sunlight" from Wikipedia, Internet publication, 2009.
"Solar Radiation Spectrum", Internet publication, 2007.

* cited by examiner

*Primary Examiner*—Philip C Tucker
*Assistant Examiner*—Michael N Orlando
(74) *Attorney, Agent, or Firm*—Oblon, Spivak, McClelland, Maier & Neustadt, L.L.P.

(57) ABSTRACT

Provided is a process for fusion-bonding plastic parts with the aid of laser radiation of a wavelength outside the visible region, wherein a bonding region of a plastic part to be bonded comprises at least one material which is transparent in the visible region of the electromagnetic spectrum, is substantially colorless and absorbs the laser radiation, wherein the material comprises at least one nonionic compound that is resistant to the laser radiation, has a thermal stability of at least 300° C. and is selected from polycyclic organic compounds, doped tin oxides and hexaborides $MB_6$ of lanthanides and alkaline earth metals M. Also provided is a preparation suitable for producing fusion-bonded plastic parts with the aid of laser radiation whose wavelength is outside the visible region, the preparation comprising: a thermoplastic matrix polymer suitable for forming the plastics parts; at least one of said material; optional UV stabilizers; and optional additives.

18 Claims, No Drawings

METHOD FOR WELDING TOGETHER PLASTIC PARTS WITH THE AID OF LASER RADIATION

CROSS-REFERENCE TO RELATED APPLICATIONS

The present application is a 35 U.S.C. §371 National Stage patent application of International patent application PCT/EP2005/003689, filed on Apr. 8, 2005, which claims priority to German patent application DE 102004018547.6, filed on Apr. 14, 2004.

FIELD OF THE INVENTION

The present invention relates to a process for fusion-bonding plastics parts with the aid of laser radiation of a wavelength outside the visible region, in which the bonding region of one of the plastics parts to be bonded has a material which is transparent in the visible region of the electromagnetic spectrum, is substantially colorless and absorbs the laser radiation.

Moreover, the invention relates to preparations suitable for producing fusion-bonded plastics parts with the aid of laser radiation whose wavelength is outside the visible region, comprising a) a thermoplastic matrix polymer suitable for forming the plastics parts,
b) at least one material which is transparent in the visible region of the electromagnetic spectrum, is substantially colorless, absorbs the laser radiation used, is nonionic, is resistant toward the laser radiation and has a thermal stability of at least 300° C., selected from the group of the polycyclic organic compounds, the doped tin oxides and the hexaborides $MB_6$ of lanthanides and alkaline earth metals M,
c) if desired, one or more UV stabilizers and
d) if desired, further additives.

DISCUSSION OF THE BACKGROUND

The laser fusion of thermoplastics is a novel method of high economic interest to manufacture plastics articles having complex geometry. In this method, the parts to be bonded are initially fixed in the correct end position relative to one another and the joining surfaces are brought into contact with one another. The bonding region is then irradiated with laser light through one of the parts until there is surface melting at least on the part lying below it and thus formation of a fusion bond between the parts which solidifies mechanically in the subsequent cooling phase.

For the absorption of the laser radiation and its conversion to heat for the melting operation, it is necessary to use absorbing materials which are either incorporated into at least one of the plastics parts or are applied thereto in such a way that they are disposed in the bonding region between the plastics parts.

Typically, for example also in EP-A-159 169, carbon black is used as the material which absorbs IR laser radiation. However, owing to the intrinsic color of the carbon black, this leads, if not to black coloration, to nontransparency of the plastics part or of the bonding region.

In addition to carbon black, DE-A-44 32 081 also recommends nigrosine as an IR-absorbing material for the fusion bonding of plastics parts. Nigrosine does not lead to discoloration of the plastic, but, owing to it having only low absorption in the NIR, comparatively high laser outputs are required at the wavelengths of 940 and 1064 nm used and lead readily to carbonization of the plastic. Moreover, nigrosine is toxic and carcinogenic.

EP-A-126 787 and DE-A-198 14 298 disclose the use of silicon dioxide as an absorber for the fusion of polyethylene films or the production of a fuel tank by fusing two hollow plastic bodies. However, silicon dioxide too does not exhibit satisfactory absorption at the laser wavelengths of 808, 940 and 1064 nm used.

Finally, WO-A-00/20157 and 03/59619 describe a process for laser-fusing plastics parts, in which dyes which substantially do not absorb in the visible region are used as an IR-absorbent coating of one plastics part. However, the dyes used do not have adequate photostability or radiation resistance. WO-A-03/59619 even explicitly mentions the decomposition of the dye. Accordingly, it is possible neither to employ multipass fusion nor quasisimultaneous fusion, in which the bridging of the gap is better and fewer stress cracks form, and only one-pass contour fusion is available. Moreover, the thermal stability of the dyes mentioned is inadequate for direct incorporation into the plastics parts to be fused by means of conventional melting methods such as extrusion, coextrusion, blow molding or injection molding. The dyes therefore have to be applied to one of the plastics parts in an additional working step, which is cost- and labor-intensive and unsuitable especially for mass production of parts which are small or have a complex shape. In addition, the dyes used and especially their photochemical and thermal degradation products are not chemically inert and tend to undesired migration in the matrix polymer.

It is accordingly an object of the present invention to remedy the disadvantages mentioned and to provide a universal process by which the plastics parts can be laser-fused in a simple manner from a process technology point of view.

SUMMARY OF THE INVENTION

The present invention relates to a process for fusion-bonding plastics parts with the aid of laser radiation of a wavelength outside the visible region, in which the bonding region of one of the plastics parts to be bonded has a material which is transparent in the visible region of the electromagnetic spectrum, is substantially colorless and absorbs the laser radiation, which comprises using, as the material absorbing the laser radiation, at least one nonionic compound resistant toward the laser radiation and having a thermal stability of at least 300° C., selected from the group of the polycyclic organic compounds, the doped tin oxides and the hexaborides $MB_6$ of lanthanides and alkaline earth metals M.

The present invention also relates to preparations suitable for producing fusion-bonded plastics parts with the aid of laser radiation whose wavelength is outside the visible region, comprising a) a thermoplastic matrix polymer suitable for forming the plastics parts,
b) at least one material which is transparent in the visible region of the electromagnetic spectrum, is substantially colorless and absorbs the laser radiation, wherein the material comprises at least one nonionic compound that is resistant to the laser radiation, has a thermal stability of at least 300° C. and is selected from polycyclic organic compounds, doped tin oxides and hexaborides $MB_6$ of lanthanides and alkaline earth metals M,
c) if desired, one or more UV stabilizers and
d) if desired, further additives.

DETAILED DESCRIPTION OF THE INVENTION

Suitable polycyclic organic compounds which absorb the laser radiation are in particular quaterrylene-3, 4:13,14-tetracarboximides and quaterrylene-3,4-dicarboximides (referred to together as "quaterrylenecarboximides" for short), and also terrylene-3, 4:11,12-tetracarboximides and terrylene-3, 4-dicarboximides (referred to together as "terrylenecarboximides" for short).

The quaterrylene- and terrylenecarboximides may be substituted or unsubstituted on the imide nitrogen atoms and/or on the ring skeleton; they preferably bear alkyl and/or aryl radicals on the imide nitrogens and are unsubstituted or bear from 2 to 8 substituents on the ring skeleton. These compounds are disclosed by EP-A-596 292, and also WO-A-96/22332, 02/76988, 02/66438, 02/68538 and 03/104232.

Particular preference is given to the quaterrylenecarboximides, of which very particular preference is given to the quaterrylene-3, 4:13,14-tetracarboximides.

Particularly suitable quaterrylenecarboximides in particular have the formula I

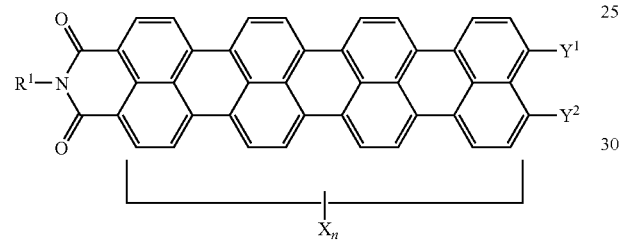

I in which the variables are each as defined as follows:
$Y^1, Y^2$ are each independently hydrogen, bromine or amino; together a radical of the formula

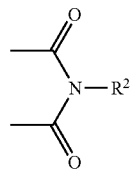

$R^1, R^2$ are each independently:
  hydrogen;
  $C_1$-$C_{30}$-alkyl whose carbon chain may be interrupted by one or more —O—, —S—, —NR$^3$—, —CO— and/or —SO$_2$— moieties and which may be mono- or polysubstituted by cyano, $C_1$-$C_o$-alkoxy, aryl which may be substituted by $C_1$-$C_{18}$-alkyl or $C_1$-$C_6$-alkoxy, and/or a 5- to 7-membered heterocyclic radical which is bonded via a nitrogen atom and may comprise further heteroatoms and be aromatic;
  $C_5$-$C_8$-cycloalkyl whose carbon chain may be interrupted by one or more —O—, —S—, —NR$^3$—, —CO— and/or —SO$_2$— moieties and which may be mono- or polysubstituted by $C_1$-$C_6$-alkyl;
  aryl or hetaryl, each of which may be mono- or polysubstituted by $C_1$-$C_{18}$-alkyl, $C_1$-$C_6$-alkoxy, cyano, —CONHR$^4$, —NHCOR$^4$ and/or aryl- or hetarylazo, each of which may be substituted by $C_1$-$C_{10}$-alkyl, $C_1$-$C_6$-alkoxy or cyano;

$R^3$ is hydrogen or $C_1$-$C_6$-alkyl;
$R^4$ is hydrogen; $C_1$-$C_{18}$-alkyl; aryl or hetaryl, each of which may be substituted by $C_1$-$C_6$-alkyl, $C_1$-$C_6$-alkoxy or cyano;
X are the same or different and are each independently halogen; $C_1$-$C_{18}$-alkyl;
  aryloxy, arylthio, hetaryloxy or hetarylthio, each of which may be mono- or polysubstituted by $C_1$-$C_{12}$-alkyl or $C_1$-$C_{12}$-alkoxy whose carbon chain may be interrupted by one or more —O—, —S—, —NR$^3$—, —CO— and/or —SO$_2$— moieties and which may be substituted by $C_1$-$C_6$-alkoxy, a 5- to 7-membered heterocyclic radical which is bonded via a nitrogen atom and may comprise further heteroatoms and be aromatic, and/or $C_5$-$C_8$-cycloalkyl whose carbon skeleton may be interrupted by one or more —O—, —S—, —NR$^3$—, —CO— and/or —SO$_2$— moieties and which may be mono- or polysubstituted by $C_1$-$C_6$-alkyl;
n is from 2 to 12.

Very particularly suitable are quaterrylenecarboximides of the formula I in which the variables are each defined as follows:
$Y^1, Y^2$ together are a radical of the formula

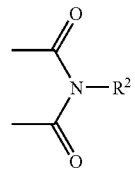

$R^1, R^2$ are each independently:
  $C_1$-$C_{30}$-alkyl whose carbon chain may be interrupted by one or more —O—, —NR$^3$— and/or —CO— moieties and which may be mono- or polysubstituted by $C_1$-$C_6$-alkoxy, aryl which may be substituted by $C_1$-$C_{18}$-alkyl or $C_1$-$C_6$-alkoxy, and/or a 5- to 7-membered heterocyclic radical which is bonded via a nitrogen atom and may comprise further heteroatoms and be aromatic;
  $C_5$-$C_8$-cycloalkyl whose carbon chain may be interrupted by one or more —O—, —NR$^3$— and/or —CO— moieties and which may be mono- or polysubstituted by $C_1$-$C_6$-alkyl;
  aryl or hetaryl, each of which may be mono- or polysubstituted by $C_1$-$C_{18}$-alkyl, $C_1$-$C_6$-alkoxy, cyano, —CONHR$^4$ and/or —NHCOR$^4$;
$R^3$ is hydrogen or $C_1$-$C_6$-alkyl;
$R^4$ is hydrogen; $C_1$-$C_{18}$-alkyl; aryl or hetaryl, each of which may be substituted by $C_1$-$C_6$-alkyl, $C_1$-$C_6$-alkoxy or cyano;
X are the same or different and are each independently halogen; aryloxy or hetaryloxy, each of which may be mono- or polysubstituted by $C_1$-$C_{12}$-alkyl or $C_1$-$C_{12}$-alkoxy whose carbon chain may be interrupted by one or more —O—, —NR$^3$— and/or —CO— moieties and which may be substituted by $C_1$-$C_6$-alkoxy, a 5- to 7-membered heterocyclic radical which is bonded via a nitrogen atom and may comprise further heteroatoms and be aromatic, and/or $C_5$-$C_8$-cycloalkyl whose carbon skeleton may be interrupted by one or more —O—, —NR$^3$— and/or —CO— moieties and which may be mono- or polysubstituted by $C_1$-$C_6$-alkyl;
n is from 2 to 8.

Specific examples of suitable $R^1$, $R^2$, $R^3$, $R^4$ and X radicals (or their substituents) are as follows:

methyl, ethyl, propyl, isopropyl, butyl, isobutyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the above terms isooctyl, isononyl, isodecyl and isotridecyl are trivial terms and stem from the alcohols obtained by the oxo process);

methoxymethyl, 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl, 3,6,9-trioxaundecyl, 3,6,9-trioxadodecyl, 3,6,9,12-tetraoxamidecyl and 3,6,9,12-tetraoxatetradecyl;

methylthiomethyl, 2-methylthioethyl, 2-ethylthioethyl, 2-propylthioethyl, 2-isopropylthio-ethyl, 2-butylthioethyl, 2- and 3-methylthiopropyl, 2- and 3-ethylthiopropyl, 2- and 3-propylthiopropyl, 2- and 3-butylthiopropyl, 2- and 4-methylthiobutyl, 2- and 4-ethyl-thiobutyl, 2- and 4-propylthiobutyl, 3,6-dithiaheptyl, 3,6-dithiaoctyl, 4,8-dithianonyl, 3,7-dithiaoctyl, 3,7-dithianonyl, 2- and 4-butylthiobutyl, 4,8-dithiadecyl, 3,6,9-trithiadecyl, 3,6,9-trithiaundecyl, 3,6,9-trithiadodecyl, 3,6,9,12-tetrathiamidecyl and 3,6,9,12-tetrathiatetradecyl;

2-monomethyl- and 2-monoethylaminoethyl, 2-dimethylaminoethyl, 2- and 3-dimethyl-aminopropyl, 3-monoisopropylaminopropyl, 2- and 4-monopropylaminobutyl, 2- and 4-dimethylaminobutyl, 6-methyl-3,6-diazaheptyl, 3,6-dimethyl-3,6-diazaheptyl, 3,6-di-azaoctyl, 3,6-dimethyl-3,6-diazaoctyl, 9-methyl-3,6,9-triazadecyl, 3,6,9-trimethyl-3,6,9-triazadecyl, 3,6,9-triazaundecyl, 3,6,9-trimethyl-3,6,9-triazaundecyl, 12-methyl-3,6,9,12-tetraazamidecyl and 3,6,9,12-tetramethyl-3,6,9,12-tetraazamidecyl;

propan-2-on-1-yl, butan-3-on-1-yl, butan-3-on-2-yl and 2-ethylpentan-3-on-1-yl;

2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonylbutyl;

2-hydroxyethyl, 3-hydroxypropyl, 1-hydroxyprop-2-yl, 2- and 4-hydroxybutyl, 1-hydroxybut-2-yl and 8-hydroxy-4-oxaoctyl;

cyanomethyl, 2-cyanoethyl, 3-cyanopropyl, 2-methyl-3-ethyl-3-cyanopropyl, 7-cyano-7-ethylheptyl and 4,7-dimethyl-7-cyanoheptyl;

methoxy, ethoxy, propoxy, isopropoxy, butoxy, isobutoxy, sec-butoxy, tert-butoxy, pentoxy, isopentoxy, neopentoxy, tert-pentoxy and hexoxy;

carbamoyl, methylaminocarbonyl, ethylaminocarbonyl, propylaminocarbonyl, butyl-aminocarbonyl, pentylaminocarbonyl, hexylaminocarbonyl, heptylaminocarbonyl, octylaminocarbonyl, nonylaminocarbonyl, decylaminocarbonyl and phenylaminocarbonyl;

formylamino, acetylamino, propionylamino and benzoylamino;

chlorine, bromine and iodine;

phenylazo, 2-napthylazo, 2-pyridylazo and 2-pyrimidylazo;

phenyl, 1- and 2-naphthyl, 2- and 3-pyrryl, 2-, 3- and 4-pyridyl, 2-, 4- and 5-pyrimidyl, 3-, 4- and 5-pyrazolyl, 2-, 4- and 5-imidazolyl, 2-, 4- and 5-thiazolyl, 3-(1,2,4-triazyl), 2-(1,3,5-triazyl), 6-quinaldyl, 3-, 5-, 6- and 8-quinolinyl, 2-benzoxazolyl, 2-benzothiazolyl, 5-benzothiadiazolyl, 2- and 5-benzimidazolyl and 1- and 5-isoquinolyl;

2-, 3- and 4-methylphenyl, 2,3-, 2,4-, 2,5-, 3,5- and 2,6-dimethylphenyl, 2,4,6-trimethyl-phenyl, 2-, 3- and 4-ethylphenyl, 2,3-, 2,4-, 2,5-, 3,5- and 2,6-diethylphenyl, 2,4,6-tri-ethylphenyl, 2-, 3- and 4-propylphenyl, 2,3-, 2,4-, 2,5-, 3,5- and 2,6-dipropylphenyl, 2,4,6-tripropylphenyl, 2-, 3- and 4-isopropylphenyl, 2,3-, 2,4-, 2,5-, 3,5- and 2,6-diisopropylphenyl, 2,4,6-triisopropylphenyl, 2- and 4-butylphenyl, 2,3-, 2,4-, 2,5-, 3,5- and 2,6-dibutylphenyl, 2,4,6-tributylphenyl, 2-, 3- and 4-isobutylphenyl, 2,3-, 2,4-, 2,5-, 3,5- and 2,6-diisobutylphenyl, 2,4,6-triisobutylphenyl, 2-, 3- and 4-sec-butylphenyl, 2,3-, 2,4-, 2,5-, 3,5- and 2,6-di-sec-butylphenyl and 2,4,6-tri-sec-butylphenyl, 2-, 3- and 4-tert-butylphenyl, 2,3-, 2,4-, 2,5-, 3,5- and 2,6-di-tert-butylphenyl, 2,4,6-tri-tert-butylphenyl; 2-, 3- and 4-methoxyphenyl, 2,3-, 2,4-, 2,5-, 3,5- and 2,6-dimethoxyphenyl, 2,4,6-trimethoxyphenyl, 2-, 3- and 4-ethoxyphenyl, 2,3-, 2,4-, 2,5-, 3,5- and 2,6-diethoxyphenyl, 2,4,6-triethoxyphenyl, 2-, 3- and 4-propoxyphenyl, 2,3-, 2,4-, 2,5-, 3,5- and 2,6-dipropoxyphenyl, 2-, 3- and 4-isopropoxyphenyl, 2,3-, 2,4-, 2,5-, 3,5- and 2,6-diisopropoxyphenyl and 2-, 3- and 4-butoxyphenyl; 2-, 3- and 4-chlorophenyl and 2,3-, 2,4-, 2,5-, 3,5- and 2,6-dichlorophenyl; 2-, 3- and 4-hydroxyphenyl and 2,3-, 2,4-, 2,5-, 3,5- and 2,6-dihydroxyphenyl; 2-, 3- and 4-cyanophenyl; 3- and 4-carboxyphenyl; 3- and 4-carboxamidophenyl, 3- and 4-N-methylcarboxamidophenyl and 3- and 4-N-ethylcarboxamidophenyl; 3- and 4-acetylaminophenyl, 3- and 4-propionylaminophenyl and 3- and 4-butyrylaminophenyl; 3- and 4-N-phenylaminophenyl, 3- and 4-N-(o-tolyl)aminophenyl, 3- and 4-N-(m-tolyl)aminophenyl and 3- and 4-N-(p-tolyl)aminophenyl; 3- and 4-(2-pyridyl)aminophenyl, 3- and 4-(3-pyridyl)aminophenyl, 3- and 4-(4-pyridyl)aminophenyl, 3- and 4-(2-pyrimidyl)aminophenyl and 4-(4-pyrimidyl)aminophenyl;

4-phenylazophenyl, 4-(1-naphthylazo)phenyl, 4-(2-naphthylazo)phenyl, 4-(4-naphthyl-azo)phenyl, 4-(2-pyridylazo)phenyl, 4-(3-pyridylazo)phenyl, 4-(4-pyridylazo)phenyl, 4-(2-pyrimidylazo)phenyl, 4-(4-pyrimidylazo)phenyl and 4-(5-pyrimidylazo)phenyl;

cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl, 3-, 4- and 5-propylcyclooctyl, 2-dioxanyl, 4-morpholinyl, 2- and 3-tetrahydrofuryl, 1-, 2- and 3-pyrrolidinyl and 1-, 2-, 3- and 4-piperidyl;

phenoxy, phenylthio, 1- and 2-naphthyloxy, 1- and 2-naphthylthio, 2-, 3- and 4-pyridyloxy, 2-, 3- and 4-pyridylthio, 2-, 4- and 5-pyrimidyloxy and 2-, 4- and 5-pyrimidylthio;

dimethylamino, diethylamino, dipropylamino, diisopropylamino, dibutylamino, diisobutylamino, di-tert-butylamino, dipentylamino, dihexylamino, diphenylamino, di-o-tolylamino, di-m-tolylamino, di-p-tolylamino and di(4-cyanophenyl)amino.

The quaterrylenecarboximides may bear 2, 4, 6, 8 or 12 X substituents on the ring skeleton. Possible ring positions for the X substituents are: 1,6; 1,7,10,16 or 1,7,11,17 or 1,6,11, 16; 1,7,9,11,17,19 or 1,7,9,11,16,18 or 1,6,8,11,16,18 or 1,6, 9,11,16,19; 1,6,7,10,11,16,17,20; 1,6,7,8,9,10,11,16,17,18,19,20. In the quaterrylene-3,4:13, 14-tetracarboximides, preference is given to tetrasubstitution in the 1,6,11,16 positions, and also to hexasubstitution in the 1,6,8,11,16,18 or 1,6,9,11,16,19 positions, and, in the quaterrylene-3,4-dicarboximides, to disubstitution in the 1, 6 or 1,7 positions, and also to tetrasubstitution in the 1,6,11,16 or 1,7,10,16 or 1,7,11,17 positions.

Suitable terrylenecarboximides have the formula II

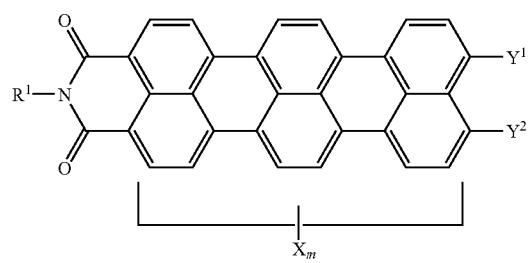

II in which the variables $Y^1$, $Y^2$, $R^1$, $R^2$, $R^3$, $R^4$ and X are each as defined for the particularly suitable quaterrylenecarboximides and m is from 2 to 8.

Likewise particularly suitable are the terrylene-3, 4:11,12-tetracarboximides which preferably bear alkyl and/or aryl radicals on the imide nitrogen atoms and from 2 to 6 substituents on the ring skeleton.

The terrylenecarboximides may bear 2, 4, 6 or 8 X substituents on the ring skeleton. Possible ring positions for the X substituents are in each case: 1,6; 1,7,9,15 or 1,6,9,14; 1,6,7, 9,14,16; 1,6,7,8,9,14,15,16. Preference is given to disubstitution in the 1,6- and tetrasubstitution in the 1,6,9,14-position.

Also suitable as the material which absorbs the laser radiation are doped tin oxides and hexaborides $MB_6$ of lanthanides and alkaline earth metals M. These inorganic absorber materials are likewise known and described, for example, in EP-A-1 008 564.

Suitable tin oxides are in particular tin oxide doped with antimony or indium (ATO and ITO respectively).

Metal hexaborides $MB_6$ include in particular yttrium hexaboride, lanthanum hexaboride, cerium hexaboride, praseodymium hexaboride, neodymium hexaboride, samarium hexaboride, europium hexaboride, gadolinium hexaboride, terbium hexaboride, dysprosium hexaboride, holmium hexaboride, erbium hexaboride, thulium hexaboride, ytterbium hexaboride, strontium hexaboride or calcium hexaboride.

These materials are preferably used in nanoparticulate form, i.e. they generally have average particle sizes of from 15 to 100 nm.

The materials used in accordance with the invention for absorbing the laser radiation feature a series of advantages:

They are transparent in the visible region of the electromagnetic spectrum and substantially colorless, so that the extent to which they alter the appearance of the fused plastics parts to the naked eye is only minor to imperceptable. In the IR region (from about 700 to 12 000 nm), especially also in the NIR region from 700 to 1200 nm, they have, in contrast, strong absorptivity, so that they can be used in an outstanding manner to absorb the relevant laser wavelengths. The polycyclic organic compounds absorb especially in the wavelength range from 700 to 950 nm, in particular from 750 to 850 nm, and may therefore be used particularly advantageously in combination with a laser of wavelength 808 nm. The inorganic absorber materials are particularly suitable for the wavelength range from 850 to 1200 nm, preferably from 900 to 1100 nm, and thus for common lasers having emission wavelengths of 940 and 1064 nm.

Moreover, they are resistant toward the laser radiation, are thus not decomposed even in the case of repeated laser irradiation and are thus also suitable for the multipass and quasisimultaneous fusion processes favorable from the process technology point of view. In addition, they have a thermal stability of at least 300° C. and may therefore also be incorporated directly into the plastics parts to be fused, without decomposition, by the common, inexpensive and process-simplifying method of bulk additization.

Since they are decomposed neither by thermal stress nor by irradiation, they enable precise adjustment of the plastics parts to be fused to a desired hue which is not altered by the fusion. The stability of the absorber materials used in accordance with the invention also allows their use for applications in which the formation of undefined degradation products has to be ruled out, such as applications in the medicinal and in the foods packaging sector.

Finally, they are very substantially stable to migration in all common matrix polymers, which is likewise a basic prerequisite for use in the medicinal and in the foods packaging sector.

In the process according to the invention for fusion-bonding thermoplastic parts, it is thus possible, as desired in each case, either to incorporate the material which absorbs the later radiation into at least one of the plastics parts to be fused or to apply it to at least one of the parts via a lamination or coating process.

Suitable bulk additization processes are specifically extrusion, also coextrusion (here, the thickness of additized coextrusion layer is generally at least 25 µm, typically 50 µm), injection molding, blow molding and kneading.

Suitable coating processes are specifically film lamination, roller-coating, spin-coating, screen-printing and pad-printing.

The amounts used of the material which absorbs the laser radiation are typically in the range from 10 to 5000 ppm. Depending upon the procedure selected, preference is generally given to the following absorber concentrations: bulk-additized slabs and injection moldings: depending on the thickness from 10 to 200 ppm; (laminatable) flat films hoses and blow-molded parts: from 20 to 500 ppm; coextrusion layers: from 50 to 1000 ppm; layers applied by screen- or pad-printing and also the abovementioned coating processes: depending on layer thickness, from 100 to 5000 ppm.

The plastics parts to be fused may have any shape. In particular, one or both parts may be a film.

In addition, the plastics parts to be fused may be composed of the same matrix polymer or of different matrix polymers. In the simplest case, the at least one plastics part which comprises the absorber material is composed of a thermoplastic matrix polymer. However, it is also possible that neither of the plastics parts to be fused is composed of thermoplastic; however, a coating of at least one part with a thermoplastic comprising the absorber material is required in this case.

The plastics parts to be bonded may be composed, for example, of a matrix polymer selected from the group of the polyolefins, polyolefin copolymers, polytetrafluoroethylenes, ethylene-tetrafluoroethylene copolymers, polyvinyl chlorides, polyvinylidene chlorides, polyvinyl alcohols, polyvinyl esters, polyvinyl alkanals, polyvinyl ketals, polyamides, polyimides, polycarbonates, polycarbonate blends, polyesters, polyester blends, poly(meth)acrylates, poly (meth)acrylate-styrene copolymer blends, poly(meth)acrylate-polyvinylidene difluoride blends, polyurethanes, polystyrenes, styrene copolymers, polyethers, polyether ketones and polysulfones and mixtures thereof.

Preference is given to matrix polymers from the group of the polyolefins, polyolefin copolymers, polyvinyl alkanals, polyamides, polycarbonates, polycarbonate-polyester blends, polycarbonate-styrene copolymer blends, polyesters, polyester blends, poly(meth)acrylates, poly(meth)acrylate-styrene copolymer blends, poly(meth)acrylate-polyvinylidene difluoride blends, styrene copolymers and polysulfones and mixtures thereof.

Particularly preferred polymers are transparent or at least translucent. Examples include: polypropylene, polyvinylbutyral, nylon-[6], nylon-[6,6], polycarbonate, polycarbonate-polyethylene terephthalate blends, polycarbonate-polybutylene terephthalate blends, polycarbonate-acrylonitrile/styrene/acrylonitrile copolymer blends, polycarbonate-acrylonitrile/butadiene/styrene copolymer blends, polymethyl methacrylate-acrylonitrile/butadiene/styrene copolymer blends (MABS), polyethylene terephthalate, polybutylene terephthalate, polymethyl methacrylate, impact-modified polymethyl methacrylate, polybutyl acrylate, polymethyl methacrylate-polyvinylidene difluoride blends, acrylonitrile/butadiene/styrene copolymers (ABS), styrene/acrylonitrile copolymers (SAN) and polyphenylenesulfone.

The preparations which are likewise in accordance with the invention and are suitable for producing fusion-bonded plastics parts with the aid of laser radiation whose wavelength is outside the visible region comprise
a) a thermoplastic matrix polymer suitable for forming the plastics parts,
b) at least one material which is transparent in the visible region of the electromagnetic spectrum, is substantially colorless, absorbs the laser radiation used, is nonionic, is resistant toward the laser radiation and has a thermal stability of at least 300° C., selected from the group of the polycyclic organic compounds, the doped tin oxides and the hexaborides $MB_6$ of lanthanides and alkaline earth metals M,
c) if desired, one or more UV stabilizers and
d) if desired, further additives.

They may advantageously be produced by a conventional extrusion or kneading process. The components b, and also, if desired c) and/or d) may be mixed from the outset, in the weight ratio corresponding to the desired end concentration, with the matrix polymer a) (direct compounding), or a distinctly higher concentration of b) and, if desired, c) and/or d) may initially be selected and the concentrate formed (masterbatch) subsequently diluted with further matrix polymer a) in the course of the manufacture of the parts to be fused.

The UV stabilizers used may be commercial substances. Suitable in addition to conventional UVB and UVA absorbers are mono- or disubstituted naphthalimides which absorb in the UVA region and mixtures thereof, for example Chimassorb® 81, and also Tinuvin® P, 326 and 328 (Ciba SC), Cyasorb® UV-1164 and UV-531 (Cytec) and Uvinul® 3030, 3035, 3050 and 3088, and also Ultraphor® VL (BASF), commercial hindered amine light stabilizers (HALS) and their N-methylated and N-methoxylated derivatives and mixtures thereof, for example Chimassorb 119 and 944, and also Tinuvin 123, 622 and 770 (Ciba SC), N 30 (Clariant), Cyasorb 3346, 3529 and 3581 (Cytec) and Uvinul 4050 and 5050 (BASF), and mixtures of these groups.

As further additives, the inventive preparations may comprise conventional plastics assistants, for example phosphitic and phenolic antioxidants, processing assistants and plasticizers.

In addition, the inventive preparations may comprise colorants for establishing a desired hue as additives, especially transparent organic pigments and in particular dyes, for example C.I. Pigment Yellow 138, 139, 183 and 185, C.I. Pigment Red 149, 178 and 179, C.I. Pigment Violet 19 and 29, C.I. Pigment Blue 15, 15:1, 15:3 and 15:4, C.I. Pigment Green 7 and 36, C.I. Solvent Yellow 93, C.I. Solvent Red 135 and 195, C.I. Solvent Blue 35, C.I. Solvent Violet 13, C.I. Solvent Green 3 and 5, and also C.I. Solvent Orange 60 and 163.

A further possible additive group is that of additives which likewise modify the visual appearance, the mechanical properties or else the tactile properties, for example matting agents such as titanium dioxide, chalk, barium sulfate, zinc sulfide, fillers such as nanoparticulate silicon dioxide, aluminum hydroxide, clay and other sheet silicates, glass fibers and glass spheres.

EXAMPLES

Example 1

The following thermoplastic matrix polymers were processed with additization with NIR absorbers from the class of the quaterrylene-3,4:13,14-tetracarboximides to give injection-molded plaques which were fusion-bonded with the aid of laser radiation to the corresponding nonadditized injection-molded plaques:

(M1) polypropylene (Metocene® X 50081, Basell)

(M2) olefin copolymer (TPO; Engage® 8401, Exxon Mobil)

(M3) polycarbonate (Macrolon® 2800, Bayer)

(M4) polymethyl methacrylate (Plexiglas® 7N, Röhm)

(M5) polstyrene (Polystyrol 1444 C, BASF)

(M6) acrylonitrile/butadiene/styrene copolymer (ABS, Terluran° GP 22, BASF)

(M7) polymethyl methacrylate-ABS blend (MABS, Terlux® 2802 TR, BASF)

(M8) polysulfone (Ultrason® S 2010, BASF)

(M9) polyethylene terephthalate (PET, Polyclear® T 94, Ter Hell)

(M10) polybutylene terephthalate (PBT, Ultradur® B 6550 N, BASF)

(M11) nylon-6 (Ultramid® BS 700, BASF)

To this end, the matrix polymers (M1) to (M11) were additized by an extrusion step with in each case 0.01% by weight (polysulfone: 0.03% by weight) of N,N'-bis(2,6-diisopropylphenyl)quaterrylene-3, 4:13,14-tetracarboximide or 0.005% by weight (polysulfone: 0.015% by weight) of N,N'-bis(2,6-diisopropylphenyl)-1,6,11,16-tetra(p-tert-octylphenoxy)quaterrylene-3, 4:13,14-tetracarboximide, and then further processed under standard conditions to give injection-molded plaques (125×42 mm edge length) with three thickness levels (1, 2 and 3 mm).

These plaques were laser-fused with in each case equally dimensioned, 3 mm-thick unadditized plaques of the same material over all thickness stages with a DFx03 diode laser having emission wavelength 808 nm (from Rofin) using the following process parameters:

(M3), (M4), (M5), (M9), (M10), (M11):

glass fiber coupling 400 µm, focal length 60 mm, input power $P_{AV}$ 4.8-6.5 watts, energy per unit length 1.09 J/mm, advance rate 6-8 mm/s (M1), (M6), (M7): glass fiber coupling 600 µm, focal length 100 mm, input power $P_{AV}$ 23-25 watts, advance rate 30 mm/s (M2):

glass fiber coupling 600 µm, focal length 100 mm, input power $P_{AV}$ 22.5 watts, advance rate 10 mm/s (M8):

glass fiber coupling 600 µm, focal length 100 mm, input power $P_{AV}$ 8 watts, advance rate 8-10 mm/s After the fusion, the plaques were unchanged and even at the fused seam exhibited no change whatsoever in color or transparency. Carrying out a tensile strain experiment under standard conditions resulted in all cases in destruction of the material before the fused seam. In none of the fused samples was there any undesired through-melting of the plate additized with the NIR absorber during the fusing operation, i.e. the absorption of the laser radiation, irrespective of the plate thickness, was exclusively in the surface layer of the additized plastics part facing the laser.

Example 2

Matrix polymers (M1) to (M11) from Example 1 were processed with additization undertaken in a similar manner to Example 1 with the NIR absorbers described there and additional coloration with the transparent organic pigments or dyes listed below to give injection-molded plaques which were fusion-bonded to colorless injection-molded plaques unadditized with NIR absorber, in a similar manner to Example 1 with the aid of laser radiation:

| (M1), (M2), (M6), (M7): | |
|---|---|
| blue: | 0.2% by weight of C.I. Pigment Blue 15:1 |
| orange: | 0.2% by weight of C.I. Pigment Orange 43 |
| red: | 0.2% by weight of C.I. Pigment Red 149 |
| green: | 0.2% by weight of C.I. Pigment Green 36 |

| (M3), (M4), (M5), (M8), (M9), (M10), (M11): | |
|---|---|
| blue: | 0.05% by weight of C.I. Solvent Blue 104 |
| orange: | 0.05% by weight of C.I. Solvent Orange 60 |
| red: | 0.05% by weight of C.I. Solvent Red 195 |
| green: | 0.05% by weight of C.I. Solvent Green 3 |

After the fusion, the plaques were unchanged and even at the fused seam exhibited no change whatsoever in color or transparency. Carrying out a tensile strain experiment under standard conditions resulted in all cases in destruction of the material before the fused seam. In none of the fused samples was there any undesired through-melting of the plate additized with the NIR absorber during the fusing operation, i.e. the absorption of the laser radiation, irrespective of the plate thickness, was exclusively in the surface layer of the additized plastics part facing the laser.

Example 3

In a similar manner to Example 1, the matrix polymers (M3) and (M4) were additized with in each case 0.04% by weight of the NIR absorber lanthanum hexaboride ($LaB_6$) which was used in the form of the commercially available 1% by weight batch in PMMA (Sumitomo Metal Mining), and processed in a similar manner to Example 1 to give injection-molded plaques which were fusion-bonded to the corresponding nonadditized injection-molded plaques with the aid of laser radiation.

In each case, two welding experiments were carried out with different lasers (variant A and B respectively) using the following process parameters:

Variant A:

DFx06 diode laser with emission wavelength 940 nm (from Rofin), glass fiber coupling 600 µm, focal length 100 mm, input power $P_{AV}$ 200 watts, advance rate 50-100 mm/s Variant B:

SWD-Y 75 diode-pumped Nd:YAG laser with emission wavelength 1064 nm (from Polyscan), direct beam 75 watts, focal length 160 mm, input power $P_{AV}$ 100 watts, advance rate 5-20 mm/s After the fusion, the plaques were unchanged and even at the fused seam exhibited no change whatsoever in color or transparency. Carrying out a tensile strain experiment under standard conditions resulted in all cases in destruction of the material before the fused seam. In none of the fused samples was there any undesired through-melting of the plate additized with the NIR absorber during the fusing operation, i.e. the absorption of the laser radiation, irrespective of the plate thickness, was exclusively in the surface layer of the additized plastics part facing the laser.

Example 4

The matrix polymers (M3) and (M4) were processed with additization with lanthanum hexaboride undertaken in a similar manner to Example 3 and additional coloration with the transparent organic pigments listed below to give injection-molded plaques which were fusion-bonded to colorless injection-molded plaques unadditized with NIR absorber, in a similar manner to Example 3 with the aid of laser radiation (in each case variant A and B):

| (M3), (M4): | |
|---|---|
| blue: | 0.02% by weight of C.I. Pigment Blue 15:1 |
| orange: | 0.02% by weight of C.I. Pigment Orange 43 |
| red: | 0.02% by weight of C.I. Pigment Red 149 |
| green: | 0.02% by weight of C.I. Pigment Green 7 |

After the fusion, the plaques were unchanged and even at the fused seam exhibited no change whatsoever in color or transparency. Carrying out a tensile strain experiment under standard conditions resulted in all cases in destruction of the material before the fused seam. In none of the fused samples was there any undesired through-melting of the plate additized with the NIR absorber during the fusing operation, i.e. the absorption of the laser radiation, irrespective of the plate thickness, was exclusively in the surface layer of the additized plastics part facing the laser.

Example 5

In a similar manner to Example 1, the matrix polymers (M3) and (M4) were additized with in each case 0.05% by weight of nanoparticulate indium tin oxide (ITO) having an average particle size of 35 nm which was used in the form of the commercially available 10% by weight preparation in triethylene glycol bis(2-ethylhexanoate) (Mitsubishi Chemicals), and processed in a similar manner to Example 1 to give injection-molded plaques which were fusion-bonded to the corresponding nonadditized injection-molded plaques with the aid of laser radiation by the following process parameters:

SWD-Y 75 diode-pumped Nd:YAG laser having emission wavelength 1064 nm (from Polyscan), direct beam 75 watts, focal length 160 mm, input power $P_{AV}$ 100 watts, advance rate 5-20 mm/s After the fusion, the plaques were unchanged and even at the fused seam exhibited no change whatsoever in color or transparency. Carrying out a tensile strain experiment under standard conditions resulted in all cases in destruction of the material before the fused seam. In none of the fused samples was there any undesired through-melting of the plate additized with the NIR absorber during the fusing operation, i.e. the absorption of the laser radiation, irrespective of the plate thickness, was exclusively in the surface layer of the additized plastics part facing the laser.

Example 6

The matrix polymers (M3) and (M4) were processed with additization with indium tin oxide undertaken in a similar manner to Example 5 and additional coloration with the dyes listed below to give injection-molded plaques which were fusion-bonded to colorless injection-molded plaques unadditized with NIR absorber in a similar manner to Example 5 with the aid of laser radiation:

| (M3), (M4): | |
|---|---|
| blue: | 0.05% by weight of C.I. Solvent Blue 104 |
| orange: | 0.05% by weight of C.I. Solvent Orange 60 |
| red: | 0.05% by weight of C.I. Solvent Red 195 |
| green: | 0.05% by weight of C.I. Solvent Green 3 |

After the fusion, the plaques were unchanged and even at the fused seam exhibited no change whatsoever in color or transparency. Carrying out a tensile strain experiment under standard conditions resulted in all cases in destruction of the material before the fused seam. In none of the fused samples was there any undesired through-melting of the plate additized with the NIR absorber during the fusing operation, i.e. the absorption of the laser radiation, irrespective of the plate thickness, was exclusively in the surface layer of the additized plastics part facing the laser.

Example 7

As described in Example 6 of WO-A-02/77081, 0.76 mm-thick films, additized in each case with 0.01% by weight of N,N'-bis(2,6-diisopropylphenyl)quaterrylene-3, 4:13,14-tetracarboximide (experiment a), 0.005% by weight of N,N'-bis(2,6-diisopropylphenyl)-1,6,11,16-tetra(p-tert-octylphenoxy)quaterrylene-3, 4:13,14-tetracarboximide (experiment b), 0.04% by weight of lanthanum hexaboride (experiment c) or 0.05% by weight of nanoparticulate indium tin oxide (experiment d), of polyvinylbutyral (Butvar®, Solutia) were produced and fusion-bonded to nonadditized films of the same thickness with the aid of laser radiation using the following process parameters:

Experiment a) and b):

DFx03 diode laser having emission wavelength 808 nm (from Rofin), glass fiber coupling 600 μm, focal length 100 mm, input power $P_{AV}$ 8 watts, advance rate 8-10 mm/s Experiment c):

DFx06 diode laser having emission wavelength 940 nm (from Rofin), glass fiber coupling 600 μm, focal length 100 mm, input power $P_{AV}$ 200 watts, advance rate 50-100 mm/s Experiment d):

SWD-Y 75 diode-pumped Nd:YAG laser with emission wavelength 1064 nm (from Polyscan), direct beam 75 watts, focal length 160 mm, input power $P_{AV}$ 100 watts, advance rate 5-20 mm/s After the fusion, the films were unchanged and even at the fused seam exhibited no change whatsoever in color or transparency. Carrying out a tensile strain experiment under standard conditions resulted in all cases in destruction of the material before the fused seam. In none of the fused samples was there any undesired through-melting of the film additized with the NIR absorber during the fusing operation, i.e. the absorption of the laser radiation, irrespective of the plate thickness, was exclusively in the surface layer of the additized plastics part facing the laser.

What is claimed is:

1. A process for fusion-bonding plastics parts with the aid of laser radiation of a wavelength outside the visible region, in which the bonding region of one of the plastics parts to be bonded has a material which is transparent in the visible region of the electromagnetic spectrum, is substantially colorless and absorbs the laser radiation, which comprises using, as the material absorbing the laser radiation, at least one nonionic compound resistant toward the laser radiation and having a thermal stability of at least 300° C., selected from the group of the quaterrylene-3, 4:13,14-tetracarboximides, quaterrylene-3,4-dicarboximides, terrylene-3,4:11,12-tetracarboximides or terrylene-3,4-dicarboximides, the doped tin oxides and the hexaborides $MB_6$ of lanthanides and alkaline earth metals M.

2. The process according to claim 1, wherein quaterrylenecarboximides of the general formula I

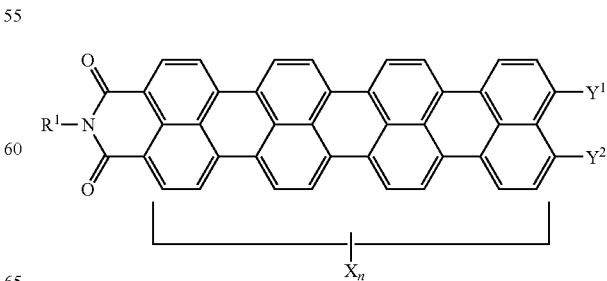

in which the variables are each as defined as follows:

$Y^1$, $Y^2$ are each independently hydrogen, bromine or amino;

together a radical of the formula

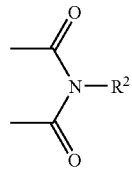

$R^1$, $R^2$ are each independently:

hydrogen;

$C_1$-$C_{30}$-alkyl whose carbon chain may be interrupted by one or more —O—, —S—, —$NR^3$—, —CO— and/or —$SO_2$— moieties and which may be mono- or polysubstituted by cyano, $C_1$-$C_6$-alkoxy, aryl which may be substituted by $C_1$-$C_{18}$-alkyl or $C_1$-$C_6$-alkoxy, and/or a 5- to 7-membered heterocyclic radical which is bonded via a nitrogen atom and may comprise further heteroatoms and be aromatic;

$C_5$-$C_8$-cycloalkyl whose carbon chain may be interrupted by one or more —O—, —S—, —$NR^3$—, —CO— and/or —$SO_2$— moieties and which may be mono- or polysubstituted by $C_1$-$C_6$-alkyl;

aryl or hetaryl, each of which may be mono- or polysubstituted by $C_1$-$C_{18}$-alkyl, $C_1$-$C_6$-alkoxy, cyano, —$CONHR^4$, —$NHCOR^4$ and/or aryl- or hetarylazo, each of which may be substituted by $C_1$-$C_{10}$-alkyl, $C_1$-$C_6$-alkoxy or cyano;

$R^3$ is hydrogen or $C_1$-$C_6$-alkyl;

$R^4$ is hydrogen; $C_1$-$C_{18}$-alkyl; aryl or hetaryl, each of which may be substituted by $C_1$-$C_6$-alkyl, $C_1$-$C_6$-alkoxy or cyano;

X are the same or different and are each independently halogen; $C_1$-$C_{18}$-alkyl; aryloxy, arylthio, hetaryloxy or hetarylthio, each of which may be mono- or polysubstituted by $C_1$-$C_{12}$-alkyl or $C_1$-$C_{12}$-alkoxy whose carbon chain may be interrupted by one or more —O—, —S—, —$NR^3$—, —CO— and/or —$SO_2$— moieties and which may be substituted by $C_1$-$C_6$-alkoxy, a 5- to 7-membered heterocyclic radical which is bonded via a nitrogen atom and may comprise further heteroatoms and be aromatic, and/or $C_5$-$C_8$-cycloalkyl whose carbon skeleton may be interrupted by one or more —O—, —S—, —$NR^3$—, —CO— and/or —$SO_2$— moieties and which may be mono- or polysubstituted by $C_1$-$C_6$-alkyl;

n is from 2 to 12;

are used as materials absorbing the laser radiation.

3. The process according to claim 1, wherein the quaterrylene carboximides of the general formula I in which the variables are each defined as follows:

$Y^1$, $Y^2$ together are a radical of the formula

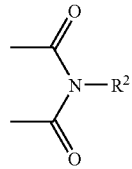

$R^1$, $R^2$ are each independently:

$C_1$-$C_{30}$-alkyl whose carbon chain may be interrupted by one or more —O—, —$NR^3$— and/or —CO— moieties and which may be mono- or polysubstituted by $C_1$-$C_6$-alkoxy, aryl which may be substituted by $C_1$-$C_{18}$-alkyl or $C_1$-$C_6$-alkoxy, and/or a 5- to 7-membered heterocyclic radical which is bonded via a nitrogen atom and may comprise further heteroatoms and be aromatic;

$C_5$-$C_8$-cycloalkyl whose carbon chain may be interrupted by one or more —O—, —$NR^3$— and/or —CO— moieties and which may be mono- or polysubstituted by $C_1$-$C_6$-alkyl; aryl or hetaryl, each of which may be mono- or polysubstituted by $C_1$-$C_{18}$-alkyl, $C_1$-$C_6$-alkoxy, cyano, —$CONHR^4$ and/or —$NHCOR^4$;

$R^3$ is hydrogen or $C_1$-$C_6$-alkyl;

$R^4$ is hydrogen; $C_1$-$C_{18}$-alkyl; aryl or hetaryl, each of which may be substituted by $C_1$-$C_6$-alkyl, $C_1$-$C_6$-alkoxy or cyano;

X are the same or different and are each independently halogen; aryloxy or hetaryloxy, each of which may be mono- or polysubstituted by $C_1$-$C_{12}$-alkyl or $C_1$-$C_{12}$-alkoxy whose carbon chain may be interrupted by one or more —O—, —$NR^3$— and/or —CO— moieties and which may be substituted by $C_1$-$C_6$-alkoxy, a 5- to 7-membered heterocyclic radical which is bonded via a nitrogen atom and may comprise further heteroatoms and be aromatic, and/or $C_5$-$C_8$-cycloalkyl whose carbon skeleton may be interrupted by one or more —O—, —$NR^3$— and/or —CO— moieties and which may be mono- or polysubstituted by $C_1$-$C_6$-alkyl;

n is from 2 to 8;

are used as materials absorbing the laser radiation.

4. The process according to claim 1, wherein the terrylenecarboximides of the general formula II

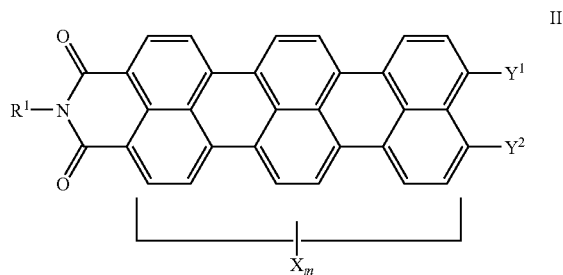

in which the variables are each as defined as follows:

$Y^1$, $Y^2$ are each independently hydrogen, bromine or amino;

together a radical of the formula

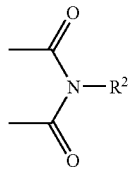

$R^1$, $R^2$ are each independently:
  hydrogen;
  $C_1$-$C_{30}$-alkyl whose carbon chain may be interrupted by one or more —O—, —S—, —NR$^3$—, —CO— and/or —SO$_2$— moieties and which may be mono- or polysubstituted by cyano, $C_1$-$C_6$-alkoxy, aryl which may be substituted by $C_1$-$C_{18}$-alkyl or $C_1$-$C_6$-alkoxy, and/or a 5- to 7-membered heterocyclic radical which is bonded via a nitrogen atom and may comprise further heteroatoms and be aromatic;
  $C_5$-$C_8$-cycloalkyl whose carbon chain may be interrupted by one or more —O—, —S—, —NR$^3$—, —CO— and/or —SO$_2$— moieties and which may be mono- or polysubstituted by $C_1$-$C_6$-alkyl;
  aryl or hetaryl, each of which may be mono- or polysubstituted by $C_1$-$C_{18}$-alkyl, $C_1$-$C_6$-alkoxy, cyano, —CONHR$^4$, —NHCOR$^4$ and/or aryl- or hetarylazo, each of which may be substituted by $C_1$-$C_{10}$-alkyl, $C_1$-$C_6$-alkoxy or cyano;
$R^3$ is hydrogen or $C_1$-$C_6$-alkyl;
$R^4$ is hydrogen; $C_1$-$C_{18}$-alkyl; aryl or hetaryl, each of which may be substituted by $C_1$-$C_6$-alkyl, $C_1$-$C_6$-alkoxy or cyano;
X are the same or different and are each independently halogen; $C_1$-$C_{18}$-alkyl; aryloxy, arylthio, hetaryloxy or hetarylthio, each of which may be mono- or polysubstituted by $C_1$-$C_{12}$-alkyl or $C_1$-$C_{12}$-alkoxy whose carbon chain may be interrupted by one or more —O—, —S—, —NR$^3$—, —CO— and/or —SO$_2$— moieties and which may be substituted by $C_1$-$C_6$-alkoxy, a 5- to 7-membered heterocyclic radical which is bonded via a nitrogen atom and may comprise further heteroatoms and be aromatic, and/or $C_5$-$C_8$-cycloalkyl whose carbon skeleton may be interrupted by one or more —O—, —S—, —NR$^3$—, —CO— and/or —SO$_2$— moieties and which may be mono- or polysubstituted by $C_1$-$C_6$-alkyl;
m is from 2 to 8;
are used as materials absorbing the laser radiation.

5. The process according to claim 1, wherein the doped tin oxides used are nanoparticulate tin oxides doped with antimony or indium.

6. The process according to claim 1, wherein the hexaborides of lanthanides and alkaline earth metals MB$_6$ used are nanoparticulate yttrium hexaboride, lanthanum hexaboride, cerium hexaboride, praseodymium hexaboride, neodymium hexaboride, samarium hexaboride, europium hexaboride, gadolinium hexaboride, terbium hexaboride, dysprosium hexaboride, holmium hexaboride, erbium hexaboride, thulium hexaboride, ytterbium hexaboride, strontium hexaboride or calcium hexaboride.

7. The process according to claim 1, wherein the material which absorbs the laser radiation has been incorporated into the plastics part or has been applied to the plastics part.

8. The process according to claim 7, wherein the material which absorbs the laser radiation has been incorporated into the plastics part via an extrusion, injection molding, blow molding or kneading process.

9. The process according to claim 7, wherein the material which absorbs the laser radiation has been applied to the plastics part via a lamination or coating process.

10. The process according to claim 1, wherein at least one of the plastics parts to be joined is a film.

11. The process according to claim 1, wherein the plastics parts to be joined are composed of a matrix polymer selected from the group of the polyolefins, polyolefin copolymers, polytetrafluoroethylenes, ethylene-tetrafluoroethylene copolymers, polyvinyl chlorides, polyvinylidene chlorides, polyvinyl alcohols, polyvinyl esters, polyvinyl alkanals, polyvinyl ketals, polyamides, polyimides, polycarbonates, polycarbonate blends, polyesters, polyester blends, poly(meth)acrylates, poly(meth)acrylate-styrene copolymer blends, poly(meth)acrylate-polyvinylidene difluoride blends, polyurethanes, polystyrenes, styrene copolymers, polyethers, polyether ketones and polysulfones and mixtures thereof.

12. The process according to claim 1, wherein the plastics parts to be joined are composed of a matrix polymer selected from the group of the polyolefins, polyolefin copolymers, polyvinyl alkanals, polyamides, polycarbonates, polycarbonate-polyester blends, polycarbonate-styrene copolymer blends, polyesters, polyester blends, poly(meth)acrylates, poly(meth)acrylate-styrene copolymer blends, poly(meth)acrylate-polyvinylidene difluoride blends, styrene copolymers and polysulfones and mixtures thereof.

13. The process according to claim 1, wherein the plastics parts to be joined are selected from the group of polypropylene, polyvinylbutyral, nylon-[6], nylon-[6,6], polycarbonate, polycarbonate-polyethylene terephthalate blends, polycarbonate-polybutylene terephthalate blends, polycarbonate-acrylonitrile/styrene/acrylonitrile copolymer blends, polycarbonate-acrylonitrile/butadiene/styrene copolymer blends, polymethyl methacrylate-acrylonitrile/butadiene/styrene copolymer blends (MABS), polyethylene terephthalate, polybutylene terephthalate, polymethyl methacrylate, polybutyl acrylate, polymethyl methacrylate-polyvinylidene difluoride blends, acrylonitrile/butadiene/styrene copolymers, styrene/acrylonitrile copolymers and polyphenylenesulfone.

14. The process according to claim 1, wherein laser radiation having a wavelength in the range from 700 to 12 000 nm is used.

15. The process according to claim 1, wherein laser radiation having a wavelength in the range from 700 to 1200 nm is used.

16. The process according to claim 1, wherein the plastics parts are composed of the same matrix-polymer or different matrix-polymers which are transparent or at least translucent.

17. The process according to claim 1, wherein the plastics parts are colored by colorants.

18. The process according to claim 1, wherein the material absorbing the laser radiation is selected from the group consisting of quaterrylene-3, 4:13,14-tetracarboximides, quaterrylene-3,4-dicarboximides, terrylene-3,4:11,12-tetracarboximides and terrylene-3,4-dicarboximides.

* * * * *